United States Patent [19]

Enders, deceased et al.

[11] Patent Number: 4,639,044
[45] Date of Patent: Jan. 27, 1987

[54] DEMOUNTABLE WHEEL

[75] Inventors: Max L. Enders, deceased, late of South El Monte; by Reinhard A. Thiel, administor, Corona, both of Calif.

[73] Assignees: William Douglas Sellers; George A. Brace, both of Pasadena, Calif.

[21] Appl. No.: 265,189

[22] Filed: May 18, 1981

Related U.S. Application Data

[63] Continuation of Ser. No. 090,550, Nov. 2, 1979, abandoned.

[51] Int. Cl.⁴ .......................... B60B 1/00; B60B 27/00
[52] U.S. Cl. ................................. 301/9 DN; 301/36 R
[58] Field of Search ................ 301/9 R, 9 DP, 9 AN, 301/9 DN, 36 R

[56] References Cited

U.S. PATENT DOCUMENTS

| 1,361,627 | 12/1920 | Scray et al. | 301/9 AN |
|---|---|---|---|
| 1,635,895 | 7/1927 | Michelin | 301/36 R |
| 2,174,070 | 9/1939 | Gaenssle | 301/36 |
| 2,269,821 | 1/1942 | Kemphert et al. | 301/9 DN |
| 2,277,843 | 3/1942 | Cambridge | 301/36 |
| 2,636,782 | 4/1953 | Canady et al. | 301/36 R |
| 2,844,409 | 7/1958 | Eksergian | 301/36 R |
| 3,166,357 | 1/1965 | Vachon et al. | 301/9 DN |
| 3,386,771 | 6/1968 | Verdier | 301/9 DN |
| 4,283,092 | 8/1982 | Enders | 301/36 R |

FOREIGN PATENT DOCUMENTS 542293 8/1922 France ............................. 301/9 AN Primary Examiner—H. Grant Skaggs
Attorney, Agent, or Firm—William Douglas Sellers; George A. Brace

[57] ABSTRACT

A demountable wheel optionally mountable on a hub equipped with cyclindrical studs and on a hub equipped with tapered studs. For this purpose the wheel is provided with a first ring of bores accommodating hubs having cylindrical studs and with a second ring of tapered bores accommodating hubs having tapered studs.

4 Claims, 4 Drawing Figures

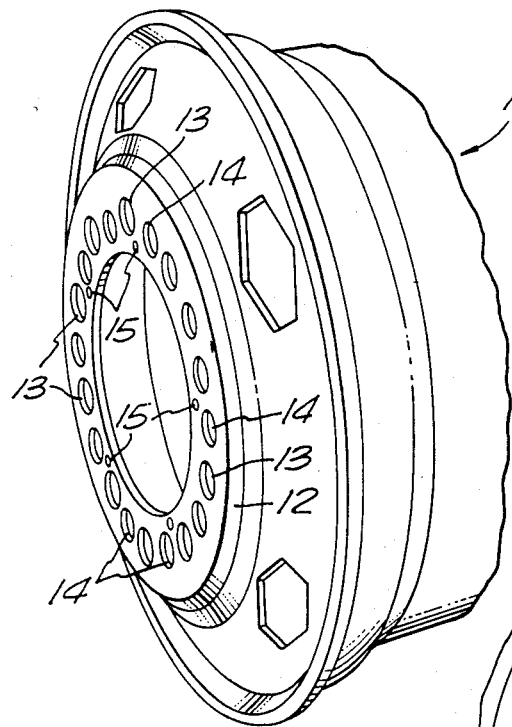
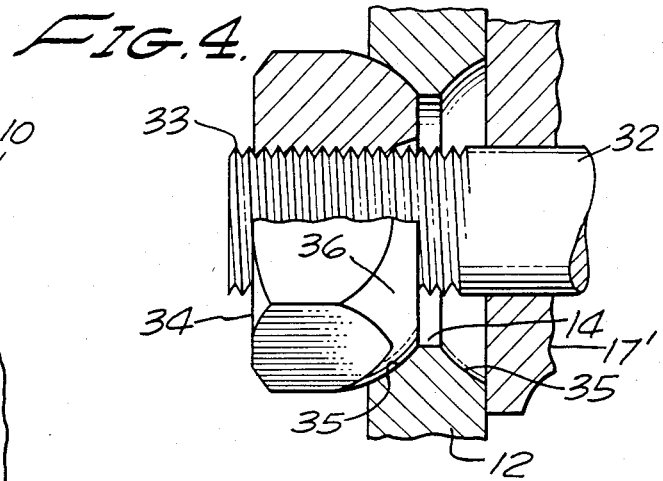
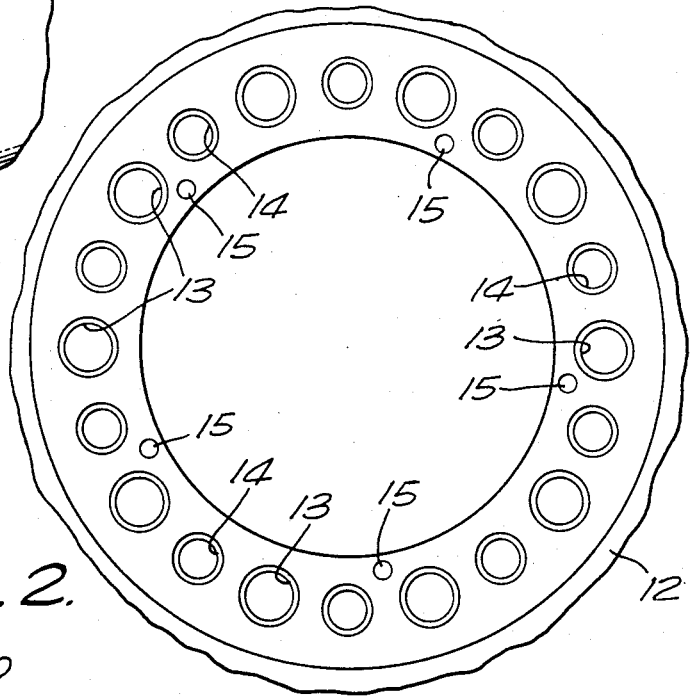
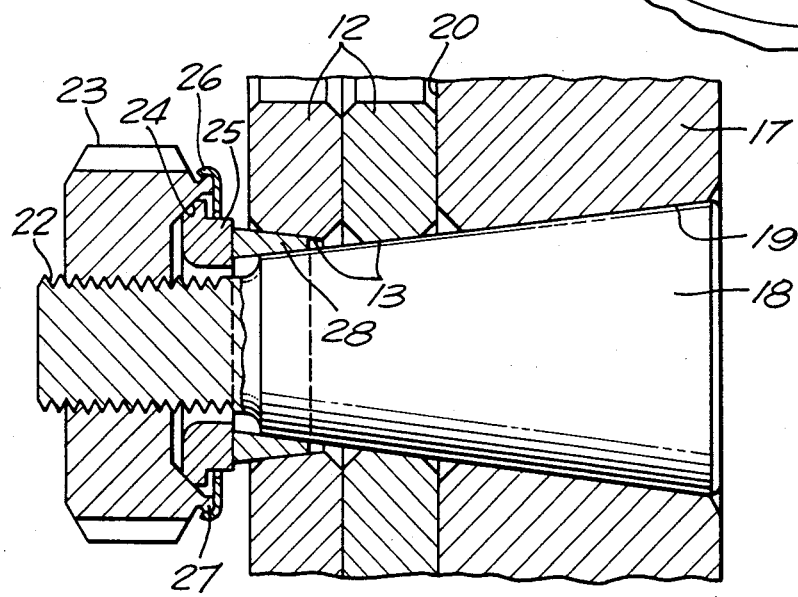

DEMOUNTABLE WHEEL

This application is a continuation of my co-pending application for U.S. Letters Patent Ser. No. 090,550 filed Nov. 2, 1979, entitled "Demountable Wheel" which application was subsequently abandoned.

This invention relates to demountable wheels and more particularly to a novel mounting facility mountable selectively on hubs equipped with one or two different types of mounting studs.

BACKGROUND OF THE INVENTION

My co-pending application for U.S. Letters Patent, Ser. No. 21,625, filed Mar. 19, 1979, discloses an improved demountable vehicle wheel and hub utilizing tapered studs fixed to the hub and seatable in tapered bores in the wheel flange. These bores have a snug fit with the tapered studs or with collets having converging surfaces complemental to the studs and the wheel mounting bores of the outer one of a dual wheel assembly. Such wheels cannot be safely used on a conventional hub equipped with cylindrical studs because of the ineffectiveness of such studs and fasteners to prevent loosening and the consequent serious hazards and problems.

SUMMARY OF THE INVENTION

This invention avoids the foregoing and other shortcomings by the provision of a demountable wheel usable interchangeably and at the user's option with either fasteners having cylindrical studs or with tapered studs with full retention of the performance characteristics of each type of wheel fastener. This objective is achieved by providing the invention wheel with dual sets of mounting bores one of which is of conventional design and the other of which is designed for use with tapered studs constructed in accordance with the teachings of my aforesaid co-pending application.

Accordingly, it is a primary object of this invention to provide a novel demountable wheel usable interchangeably with either a conventional hub equipped with cylindrical studs or a hub having tapered studs.

Another object of the invention is the provision of an improved demountable wheel usable singly and in dual relationship with hubs equipped either with cylindrical stud fasteners or tapered stud fasteners.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary perspective view of the invention demountable wheel from one end face thereof;

FIG. 2 is a fragmentary elevational view on an enlarged scale of the hub mounting portion of the wheel shown in FIG. 1;

FIG. 3 is a cross sectional view on an enlarged scale through a vehicle hub equipped with tapered studs showing a pair of identical wheels embodying this invention mounted thereon; and FIG. 4 is a fragmentary view of a conventional type wheel hub equipped with cylindrical stud fasteners and showing a single one of the invention wheels mounted thereon.

Referring initially more particularly to FIGS. 1 and 2, there is shown an illustrative embodiment of my improved demountable wheel, designated generally 10, having a mounting flange 12 provided with two sets of bores 13, 14 bores 13 being interspersed between adjacent bores of set 14. Additionally, flange 12 is provided with a plurality of threaded bores 15 to mate with pry-off cap screws, not shown, which can be employed as described in my application Ser. No. 21,625 to dislodge the wheels from a hub equipped with tapered studs. These cap screws are inserted in threaded bores 15 and tightened progressively until the wheel is free. In many instances it is found that the use of the pry-off to remove the outer wheel is unnecessary and that tapping blows applied to the tire of the outer wheel suffices to dislodge collets 28 and this wheel from the studs. The pry-off screws are then used in the same manner to loosen the inner wheel as the pry-off screws are tightened against the underlying hub structure 17.

Referring to FIG. 3, there is a fragmentary showing of a wheel hub 17 equipped with a ring of tapered studs 18 the larger end of which has a forced press fit in tapered bores 19 of the hub. The smaller end of these studs projects from the outer face 20 of the hub by a distance preferably not in excess of the thickness of the wheel flange. As shown in FIG. 3, the tapered studs project a distance slightly less than the combined thickness of a pair of dual wheels 12, 12. Each one of the mounting bores 13 is tapered substantially throughout its axial length by an angle corresponding to the taper of studs 18 and is sized to have a snug fit with the base portion of the stud projecting beyond face 20 of the hub. The outer end of the stud has a threaded shank 22 for the fastener nut 23 the inner end of this nut has a well provided with a tapered surface 24 against which a similarly tapered surface of the self-aligning washer 25 seats. The shouldered periphery of this washer is held loosely assembled to the nut by a keeper ring 26 swaged or otherwise held assembled to a lip 27 projecting outwardly from the inner end of nut 23.

Washer 25 bears against the outer thicker end of a split spring collet 28 having inner and outer surfaces which taper at the same angle as the juxaposed surfaces of bores 13 and studs 18 In this connection it will be noted when dual wheels are mounted on the tapered studs the outer wheel is reversed so that the tapered bores expand outwardly and in the opposite direction from the taper of the bores on the inner one of the two wheels. Accordingly, after the wheels are assembled over studs 18 collets 28 are inserted following which nuts 23 are assembled and tightened to force collets 28 and the two wheels into the fully assembled position shown in FIG. 3. In this position the tapered surfaces of bores 13 are in direct and full metal-to-metal contact with studs 18 and collets 28, it being noted that the collets of the outer wheel are sandwiched between the outer end of the studs and the bores of the outer wheel. In consequence, all load forces and all operating forces encountered in the use of the vehicle are transmitted via direct metal-to-metal contact between the studs and each of the wheels and are completely isolated from the stud threads 22 and the mating threads of nuts 23. The wheels are demounted by unwrenching nuts 23 and tapping the outer wheel to dislodge it along with collets 28. The inner wheel may be so snugly seated on lugs 18 that tapping forces applied to that wheel are inadequate. In this event, pry-off cap screws, not shown, can be screwed into the threaded bores 15 and advanced against the structure directly behind the wheel, such as the hub 17, to force the wheel axially off studs 18. Conventional cap screws having a length at least double the length of threaded bores 15 are suitable and effective for this purpose.

Referring now to FIG. 4, it is pointed out that a conventional wheel mounting hub 17′ is there shown equipped with typical cylindrical studs 32 having threads 33 for a conventional stud nut 34. As there shown, studs 32 are only long enough to mount a single wheel 12; however, they are commonly sufficiently long to accomodate dual wheels. In accordance with customary practice, the wheel mounting bores 14 are provided with, at their opposite ends, semi-spherical recesses 35 conforming with the complementally contoured inner end 36 of the stud not 34. It will therefore be evident that in accordance with customary practice surface 36 is adapted to seat snugly in recesses 35 depending upon whether wheel 12 is mounted innermost or outermost on the cylindrical studs 32. As will be evident from FIG. 4 all load forces encountered in the operation of the vehicle are transmitted between the wheel and stud through nut 34 and threads 33. This results in loosening of the fasteners, particularly in dual wheel assemblies.

While the particular demountable wheel herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

It is claimed:

1. A pair of demountable vehicle wheels mountable interchangeable with either wheel innermost either on (1) an axle hub equipped with a ring of threaded cylindrical studs fixedly mounted therein each having a lug nut provided with a semi-spherical inner end and on (2) an axle hub equipped with a ring of threaded studs fixedly mounted therein having an exposed tapered length nearly as great as the combined thickness of the respective hubs of said pair of wheels which tapered studs each have a lug nut and a collet ring which ring has converging inner and outer surfaces tapered similarly to said tapered studs, each of said wheels having:
   a hub;
   a first ring of bores about the axis of said wheel hub sized and positioned to telescope loosely over an axle hub equipped with said threaded cylindrical studs which bores are provided with semi-spherical recesses to seat the similarly contoured end of a lug nut mounted on the outer end of said threaded cylindrical studs;
   a second ring of bores about the axis of said wheel hub tapered similarly to said tapered studs and sized and positioned to telescope over an axle hub equipped with said tapered studs;
   the tapered bores of a first one of said wheels being adapted to have a snug metal-to-metal fit with the larger inner ends of said tapered studs with the smaller outer ends thereof projecting outwardly beyond the outer side of said wheel hub for a distance somewhat less than the thickness of said wheel hub;
   a second one of said wheels being invertable with its tapered bores flaring outwardly and adapted to be telescoped loosely over the smaller outer ends of said tapered studs and clamped rigidly thereto by lug nuts wrenched onto said tapered studs and against said collet rings having inner and outer surfaces tapered similarly to said tapered bores and said tapered studs whereby said collet rings have metal-to-metal contact with said studs and with the tapered bores of said second wheel when said lug nuts are wrenched tight.

2. A pair of demountable wheels as defined in claim 1 characterized in that said tapered studs and said second ring of tapered bores are similarly tapered acutely to their respective axes.

3. A pair of demountable wheels as defined in claim 1 characterized in the provision of a plurality of threaded bores through said wheel hubs adapted to seat a respective pry-off screw adapted to be wrenched thereinto if necessary to dislodge the wheel from said tapered studs during a demounting operation of said wheels.

4. A pair of demountable wheels as defined in claim 3 characterized in that said threaded bores for pryoff screws are spaced between and unequally from a respective pair of said tapered bores.

* * * * *